(12) United States Patent
Onishi

(10) Patent No.: US 12,147,719 B2
(45) Date of Patent: Nov. 19, 2024

(54) IMAGE FORMING APPARATUS AND CONTROL METHOD FOR ACQUIRING OPERATION GUIDE

(71) Applicant: SHARP KABUSHIKI KAISHA, Sakai (JP)

(72) Inventor: Takahisa Onishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/110,832

(22) Filed: Feb. 16, 2023

(65) Prior Publication Data

US 2023/0266932 A1   Aug. 24, 2023

(30) Foreign Application Priority Data

Feb. 21, 2022   (JP) ................... 2022-024359

(51) Int. Cl.
*G06F 3/12*   (2006.01)
(52) U.S. Cl.
CPC .......... *G06F 3/1231* (2013.01); *G06F 3/1204* (2013.01); *G06F 3/1292* (2013.01)
(58) Field of Classification Search
CPC ..... G06F 3/1204; G06F 3/1231; G06F 3/1292
See application file for complete search history.

(56) References Cited

U.S. PATENT DOCUMENTS

| | | | | |
|---|---|---|---|---|
| 6,606,460 B2 * | 8/2003 | Konno | ............... | G03G 15/5079 |
| | | | | 399/9 |
| 7,257,741 B1 * | 8/2007 | Palenik | ................. | G06F 11/079 |
| | | | | 714/4.3 |
| 11,902,478 B2 * | 2/2024 | Oka | ................... | H04N 1/00037 |
| 2006/0106852 A1 * | 5/2006 | Siddall | .................. | G06F 16/113 |
| 2007/0064594 A1 * | 3/2007 | Norton | ................ | H04L 41/0631 |
| | | | | 370/228 |
| 2009/0281993 A1 * | 11/2009 | Hadley | .................... | G06F 16/93 |
| 2017/0123736 A1 * | 5/2017 | Park | ....................... | G06F 3/1234 |
| 2017/0331966 A1 * | 11/2017 | Nakanishi | .......... | H04N 1/00435 |

FOREIGN PATENT DOCUMENTS

JP   2006-345041 A   12/2006

OTHER PUBLICATIONS

User Guide in the device An IP.com Prior Art Database Technical Disclosure Author: Bibhudendu Mohapatra IP.com No. IPCOM000211856D (Year: 2011).*
User Guide in the device (Year: 2011).*

* cited by examiner

*Primary Examiner* — Barbara D Reinier
(74) *Attorney, Agent, or Firm* — ScienBiziP, P.C.

(57) ABSTRACT

An image forming apparatus includes a displayer capable of displaying an operation guide for the image forming apparatus; a first communicator that performs communication for acquiring the operation guide from an external device via a network; a second communicator that performs short-range wireless communication with a terminal of a user operating the image forming apparatus; and a controller that performs control of notifying, from the second communicator, the terminal of access information of accessing the external device for acquiring the operation guide, in a case where a failure has occurred in communication by the first communicator.

8 Claims, 10 Drawing Sheets

IMAGE FORMING APPARATUS AND CONTROL METHOD FOR ACQUIRING OPERATION GUIDE

CROSS-REFERENCE TO RELATED APPLICATION

The present application claims priority from Japanese Application JP 2022-024359, the content of which is hereby incorporated by reference into this application.

BACKGROUND OF THE INVENTION

Field of the Invention

The present disclosure relates to an image forming apparatus and a control method.

Description of the Related Art

There is a known a technique in which a network multifunction device acquires guidance data related to an operation of the network multifunction device from a server via a network.

In a case where an image forming apparatus such as a network multifunction device acquires an operation guide from an external server via a network, the image forming apparatus cannot acquire the operation guide, when a network function of the image forming apparatus is abnormal. In this case, a user operating the image forming apparatus cannot view the operation guide.

As one aspect, an object of the present disclosure is to provide an image forming apparatus and the like capable of viewing an operation guide, even when a communication failure has occurred in the image forming apparatus.

SUMMARY OF THE INVENTION

An image forming apparatus according to an aspect of the present disclosure includes: a displayer capable of displaying an operation guide for the image forming apparatus; a first communicator that performs communication for acquiring the operation guide from an external device via a network; a second communicator that performs short-range wireless communication with a terminal of a user operating the image forming apparatus; and a controller that performs control of notifying, from the second communicator, the terminal of access information of accessing the external device for acquiring the operation guide, in a case where a failure has occurred in communication by the first communicator.

According to the present disclosure, it is possible to provide an image forming apparatus and the like capable of viewing an operation guide, even when a communication failure has occurred in the image forming apparatus.

DETAILED DESCRIPTION OF THE INVENTION

In the following, each embodiment is described. Each following embodiment can be modified as appropriate. Also, a configuration of each embodiment can be replaced with a substantially similar configuration, a configuration that provides a similar advantageous effect, or a configuration that can achieve a similar object. Furthermore, the order of processing in a flowchart described in each embodiment can be interchanged as much as possible.

First Embodiment

Figure 1:
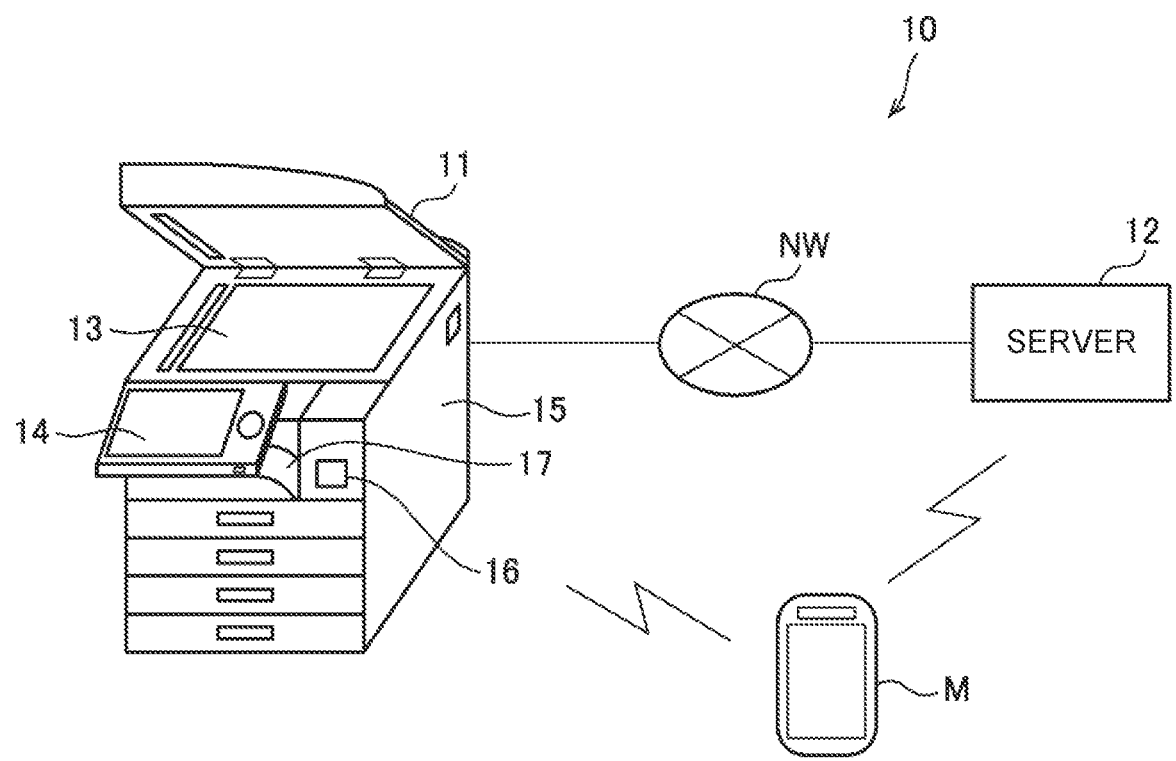
FIG. 1 is a diagram illustrating an example of a hardware configuration of a system.

FIG. 1 is a diagram illustrating an example of a hardware configuration of a system 10 according to each embodiment. The system 10 includes an image forming apparatus 11, a server 12, and a terminal M. The image forming apparatus 11 is, for example, a multi function peripheral (MFP). The image forming apparatus 11 includes a document reading device 13, an operation panel 14, a first transmitter/receiver 15, a second transmitter/receiver 16, and a paper discharge tray 17.

The image forming apparatus 11 is connected to the server 12 via a network NW. The network NW is, for example, an Internet network. The server 12 is an external device that stores an operation guide. The server 12 provides the operation guide to the image forming apparatus 11. The server 12 may be, for example, a cloud server.

A user of the image forming apparatus 11 can view an operation guide indicating an operation method of the image forming apparatus 11, or a method of coping with a trouble that has occurred in the image forming apparatus 11. The operation guide may be updated. In this case, the server 12 updates the operation guide. In a case where the server 12 receives a request to acquire an operation guide from the image forming apparatus 11, the server 12 transmits a latest operation guide to the image forming apparatus 11.

The document reading device 13 is a device that reads a set document. The operation panel 14 is, for example, a touch panel display having a display function and an operation function. The display function and the operation function of the operation panel 14 may be provided separately.

The first transmitter/receiver 15 is connected to the network NW, and performs communication with the server 12. The first transmitter/receiver 15 is, for example, a network interface card that is communicatively connected to the network NW.

The second transmitter/receiver 16 has a function of performing short-range wireless communication such as Wireless Fidelity (Wi-fi), Bluetooth (registered trademark), and near field communication (NFC). The second transmitter/receiver 16 performs short-range wireless communication with the terminal M possessed by the user operating the image forming apparatus 11.

The paper discharge tray 17 is a portion that receives a paper medium such as paper discharged from the image forming apparatus 11. The image forming apparatus 11 may be arranged with buttons and the like for allowing a user to operate, other than the operation panel 14. For example, the image forming apparatus 11 performs processing such as image forming and image reading, based on a user operation using the operation panel 14 and the above-described buttons.

The terminal M is, for example, a mobile terminal such as a smartphone or a mobile phone. The terminal M includes a screen and an operation acceptor. The screen and the operation acceptor may be a touch panel display. The terminal M can perform communication with the server 12 via a wireless communication network. The terminal M can also perform short-range wireless communication with the second transmitter/receiver 16 of the image forming apparatus 11.

Figure 2:
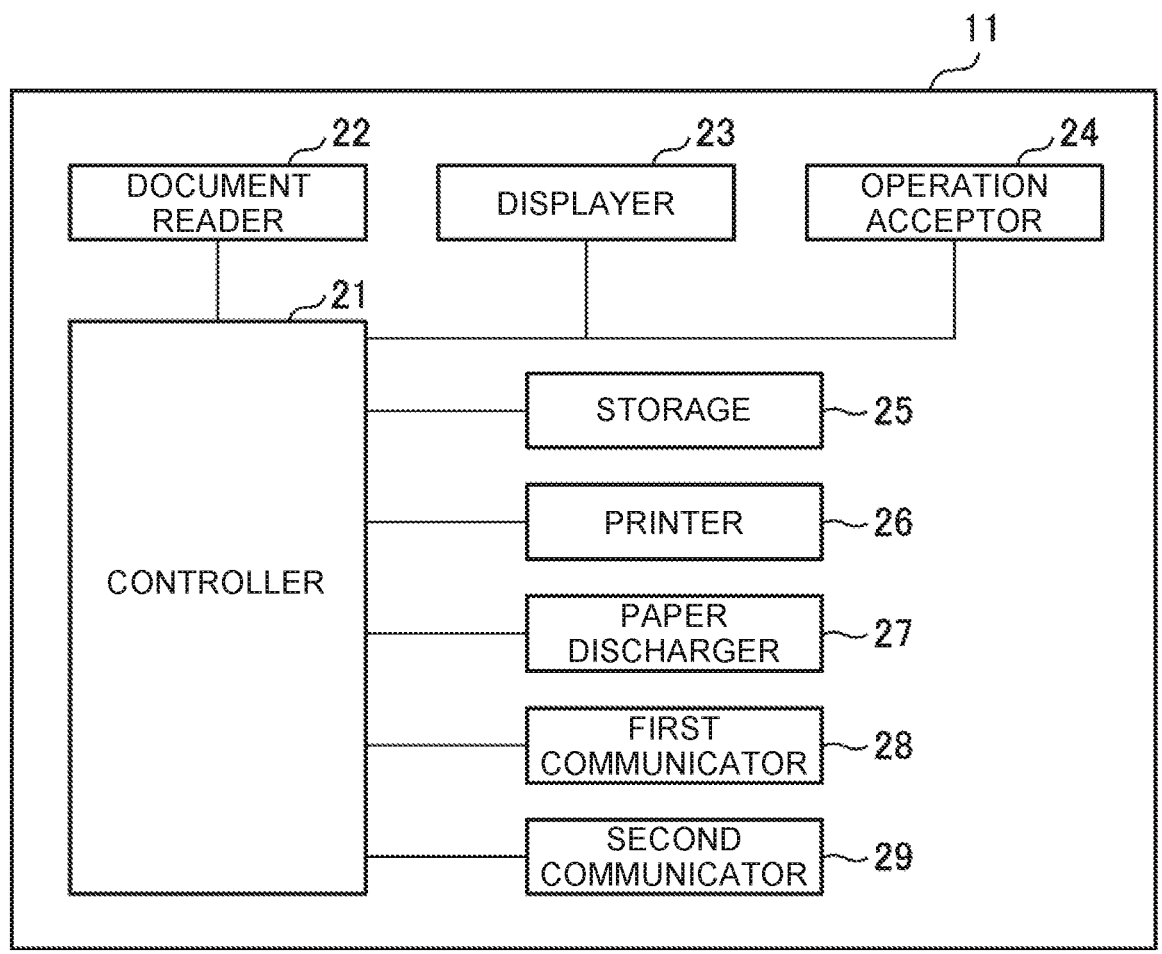
FIG. 2 is a diagram illustrating an example of a functional block of an image forming apparatus.

FIG. 2 is a diagram illustrating an example of a functional block of the image forming apparatus 11. The image forming apparatus 11 in FIG. 2 includes a controller 21, a document reader 22, a displayer 23, an operation acceptor 24, a storage 25, a printer 26, a paper discharger 27, a first communicator 28, and a second communicator 29.

The controller 21 performs various controls according to the present embodiment. The controller 21 includes a processor and a memory. By causing the processor to execute a plurality of command sets stored in the memory, various controls according to the present embodiment can be achieved. Any processor such as a central processing unit (CPU), a graphics processing unit (GPU), and a field programmable gate array (FPGA) can be applied as the processor. The controller 21 is equivalent to a computer.

The document reader 22 is equivalent to the document reading device 13. The displayer 23 plays a role of a display function of the operation panel 14, and the operation acceptor 24 plays a role of an operation function of the operation panel 14. A display content of the displayer 23 may be controlled by, for example, the GPU or the like of the controller 21.

The storage 25 stores various pieces of data. In the present embodiment, the storage 25 stores an operation guide. The printer 26 prints text, an image, and the like on paper. The paper discharger 27 discharges, to the paper discharge tray 17, paper on which text, an image, and the like are printed. There may be a plurality of destinations to which printed paper is discharged. The first communicator 28 is equivalent to the first transmitter/receiver 15. The second communicator 29 is equivalent to the second transmitter/receiver 16.

Figure 3:
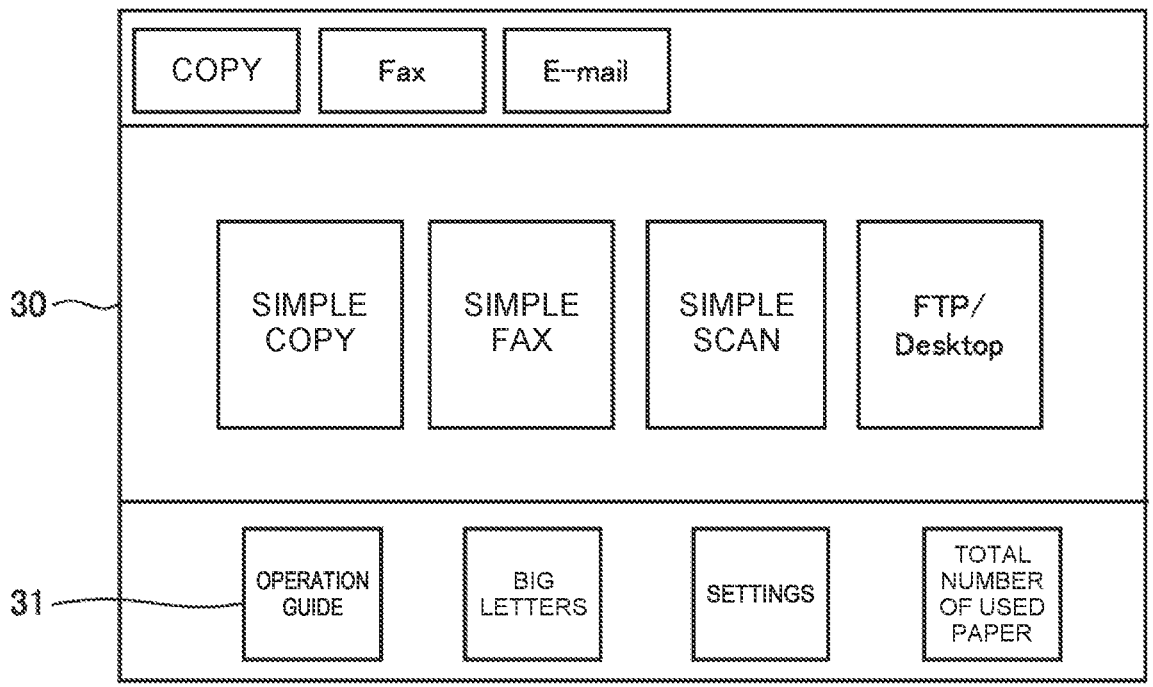
FIG. 3 is a diagram illustrating an example of a home screen to be displayed on an operation panel.

FIG. 3 is a diagram illustrating an example of a home screen to be displayed on the operation panel 14. The home screen is, for example, a screen that is initially displayed when a user operates the image forming apparatus 11. The home screen in FIG. 3 is arranged with a plurality of buttons, any of which can be selected. For example, when a "simple scan" button is pressed, a simple scan setting screen is displayed on the operation panel 14. The simple scan setting screen allows various settings regarding simple scan (settings such as a document scanning condition). Further, the simple scan setting screen includes a start button. When the start button is pressed, the image forming apparatus 11 reads a document set on the document reading device 13, and converts the read document into image data.

A home screen 30 includes an operation guide button 31. The operation guide button 31 is, for example, a button for displaying an operation guide indicating an operation method, when a user uses a function such as enlarged copying and poster printing among copy functions, of which the user wishes to check an operation method and the like. The operation guide may be information indicating an operation method or a usage method of various functions related to the image forming apparatus 11, as well as the printing function described above. The operation guide may also be information indicating a method of coping with a trouble, in a case where a trouble has occurred in the image forming apparatus 11. The trouble may be a trouble of communication failure.

For example, when the user presses the operation guide button 31, the operation acceptor 24 detects that the operation guide button 31 has been pressed, and notifies the controller 21 of a detection result. When the controller 21 recognizes that the operation guide button 31 has been pressed, the controller 21 performs control of causing the operation panel 14 to display a top page screen of an operation guide.

Figure 4:
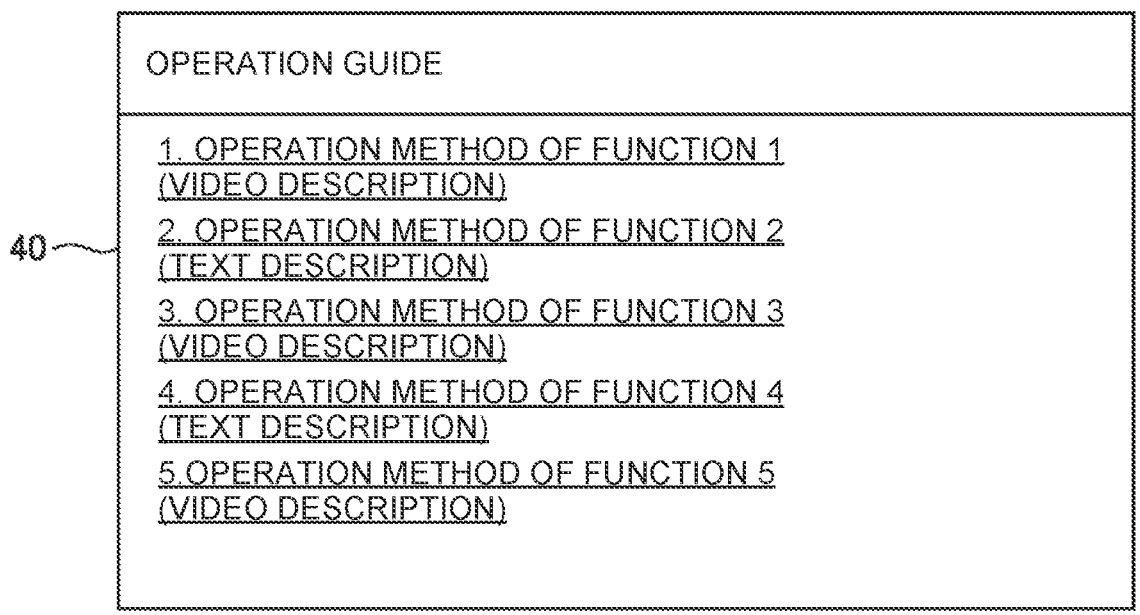
FIG. 4 is a diagram illustrating an example of a top page screen of an operation guide.

FIG. 4 is a diagram illustrating an example of a top page screen of an operation guide. A top page screen 40 includes a plurality of selection items. The top page screen 40 illustrated in FIG. 4 includes selection items including a link for an operation method of each of functions 1 through 5. Each function is, for example, various functions such as a copy function, a fax function, and an E-mail function.

Each selection item on the top page screen 40 indicates a type of associated data. For example, the operation method of the function 1 indicates that the operation method is an operation method by video. Further, the operation method of the function 2 indicates that the operation method is an operation method by text information (text). When the controller 21 receives, from the operation acceptor 24, a notification indicating that an operation of selecting any of the selection items is accepted, the controller 21 performs processing of acquiring an operation guide for an operated function.

Figure 5:
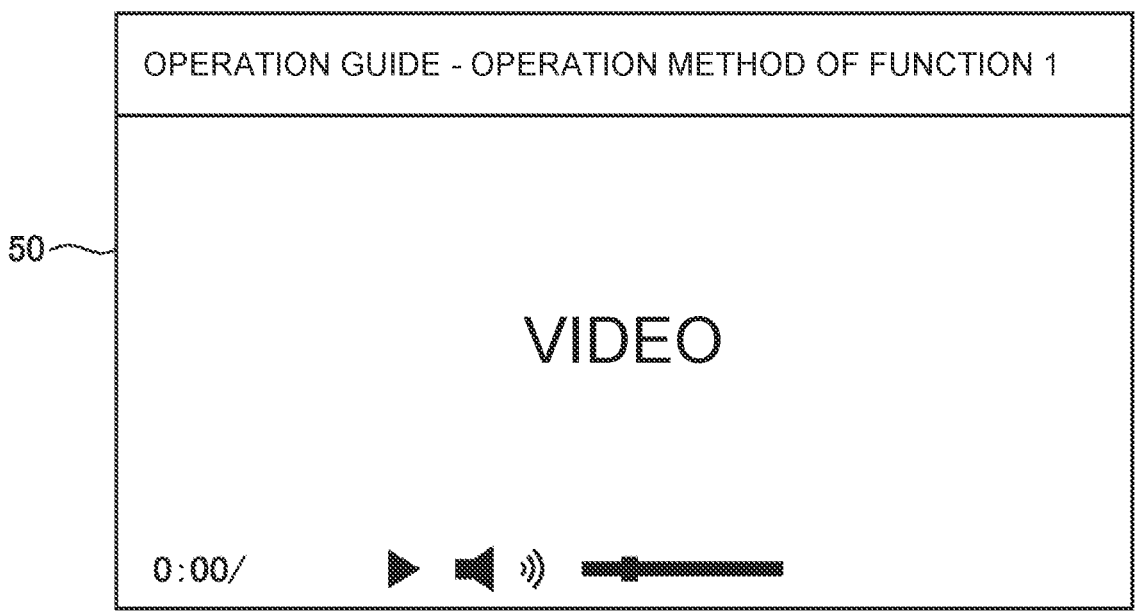
FIG. 5 is a diagram illustrating an example of an operation guide screen of video.

FIG. 5 is a diagram illustrating an example of an operation guide screen of video. An operation guide screen 50 in FIG. 5 is a screen to be displayed on the operation panel 14, in a case where a selection item of the function 1 is selected from among the selection items on the top page screen 40 in FIG. 4. For this reason, the operation guide screen 50 in FIG. 5 is a screen on which a video illustrating an operation method of the function 1 is reproduced.

Figure 6:
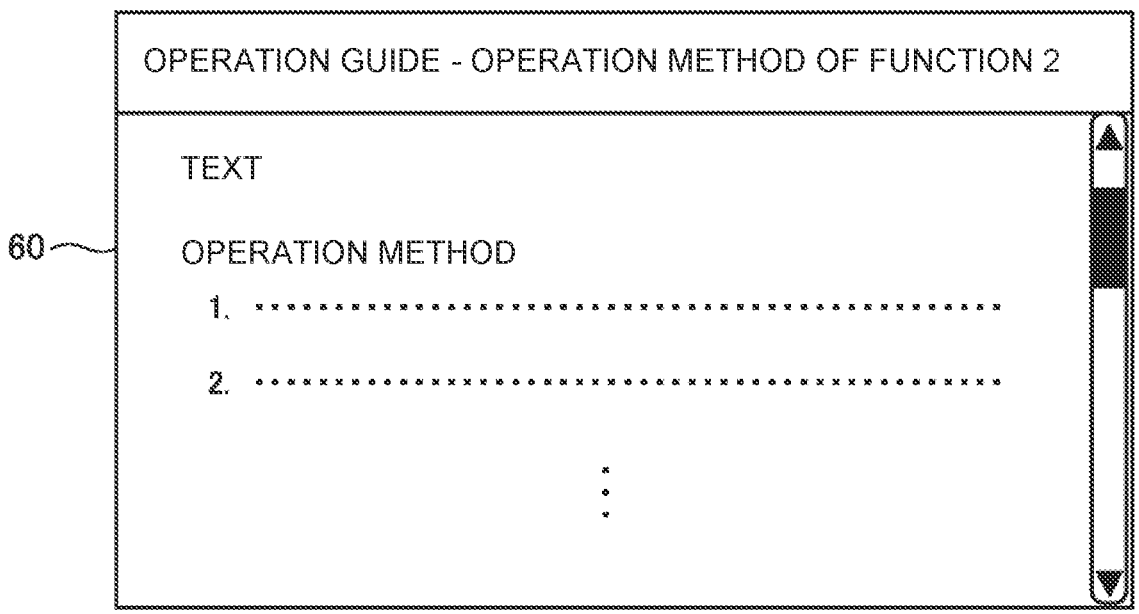
FIG. 6 is a diagram illustrating an example of an operation guide screen of text information.

FIG. 6 is a diagram illustrating an example of an operation guide screen of text information. An operation guide screen 60 in FIG. 6 is a screen to be displayed on the operation panel 14, in a case where a selection item of the function 2 is selected from among the selection items on the top page screen 40 in FIG. 4. For this reason, the operation guide screen 60 in FIG. 6 is a screen on which text information indicating an operation method of the function 2 is displayed.

Figure 7:
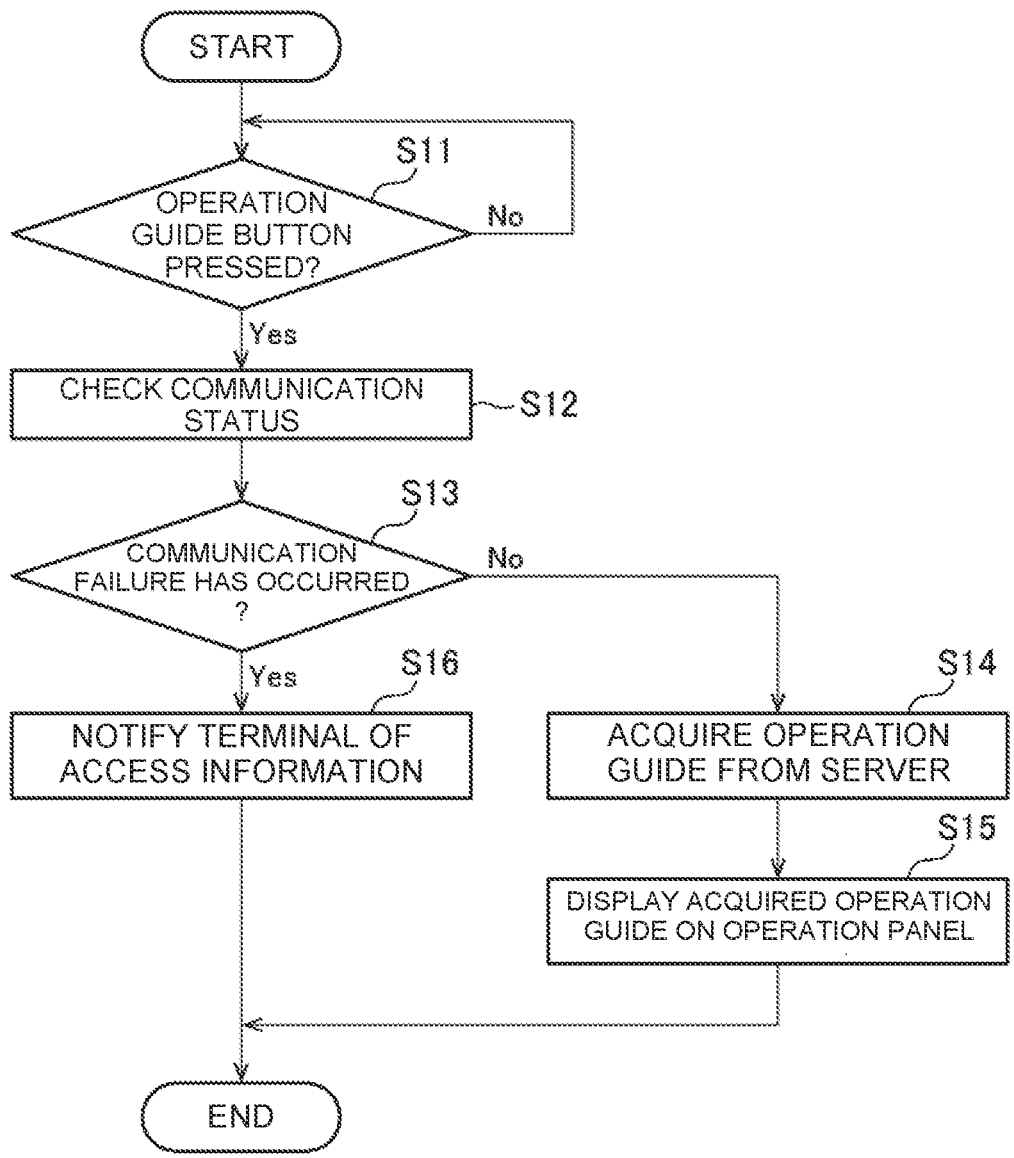
FIG. 7 is a flowchart illustrating an example of a flow of processing according to a first embodiment.

FIG. 7 is a flowchart illustrating an example of a flow of processing according to the first embodiment. Hereinafter, it is assumed that a user using the image forming apparatus 11 performs an operation on the operation panel 14. It is also assumed that the user possesses the terminal M. The controller 21 determines whether the operation guide button 31 has been pressed, when the home screen 30 in FIG. 3 is displayed on the operation panel 14 (step S11).

In a case where the controller 21 determines No in step S11 (in a case where the operation guide button 31 is not pressed), the controller 21 returns the processing to step S11. In this case, the controller 21 waits until the operation guide button 31 is pressed. On the other hand, in a case where the controller 21 determines Yes in step S11 (in a case where the operation guide button 31 has been pressed), the controller 21 proceeds the processing to step S12.

The controller 21 checks a communication status of the image forming apparatus 11 (step S12). The controller 21 mainly checks whether a failure of a communication function (communication failure: network trouble) has occurred in the image forming apparatus 11. The controller 21 may, for example, control the first communicator 28, and determine whether a communication failure has occurred in the image forming apparatus 11 by a method using an Internet control message protocol (ICMP). The controller 21 may, for example, transmit a packet, and determine whether a communication failure has occurred in the image forming apparatus 11, based on whether a reply packet to the transmitted packet has been normally received.

The controller 21 determines whether a communication failure has occurred based on the communication status checked in step S12 (step S13). In a case where the controller 21 determines No in step S13 (in a case where a communication failure has not occurred), the controller 21 proceeds the processing to step S14.

Since a communication failure has not occurred, the controller 21 preforms control of acquiring a selected operation guide from the server 12 (step S14). The controller 21 transmits a request to the server 12 to acquire a selected operation guide from the first communicator 28 via the network NW. The server 12 transmits, to the image forming apparatus 11, the operation guide according to the received request. Thus, the controller 21 of the image forming apparatus 11 acquires the selected operation guide.

The controller 21 performs control of displaying the acquired operation guide on the operation panel 14 (step S15). When the acquired operation guide is a video, the operation guide screen 50 of video as illustrated in FIG. 5 is displayed on the operation panel 14. When the acquired operation guide is text information, the operation guide screen 60 as illustrated in FIG. 6 is displayed on the operation panel 14.

In a case where the controller 21 determines Yes in step S13 (in a case where a communication failure has occurred), the controller 21 proceeds the processing to step S16. Since a communication failure has occurred, the controller 21 controls the second communicator 29, and performs control of notifying the user's terminal M of information (access information) for use in accessing the server 12 for acquiring an operation guide (step S16).

The controller 21 controls the second communicator 29, and notifies the terminal M of access information by short-range wireless communication. The notification includes information for use in accessing the server 12 for acquiring an operation guide. The information for use in accessing the server 12 is, for example, a uniform resource locator (URL) indicating an address of the server 12.

The above notification is displayed on a screen of the terminal M. The user operating the image forming apparatus 11 performs an operation of accessing the URL included in the notification, based on the notification displayed on the screen of the terminal M. For example, the above notification may be displayed on the screen of the terminal M in such a manner that the URL can be pressed. Upon accepting the operation of accessing the URL, the terminal M accesses the server 12 via a wireless communication network.

Even when a failure has occurred in communication by the image forming apparatus 11 via the network NW, communication via the wireless communication network between the terminal M and the server 12 is not affected. Therefore, even when a communication failure has occurred in the image forming apparatus 11, the terminal M can acquire an operation guide for the image forming apparatus 11.

In the first embodiment, the controller 21 causes the terminal M to acquire an operation guide, in a case where a communication failure has occurred in the image forming apparatus 11. This allows the user to view the operation guide for the image forming apparatus 11 on a screen of the terminal M, even when a communication failure has occurred in the image forming apparatus 11.

In the foregoing, the controller 21 may transmit a notification other than the URL of server 12 to the terminal M via the second communicator 29. For example, in a case where an application associated with the image forming apparatus 11 is installed in the terminal M, the controller 21 may perform control of notifying the application of the terminal M of access information. The application of the terminal M may automatically access the server 12, based on the notification, and acquire an operation guide from the server 12.

Second Embodiment

Figure 8:
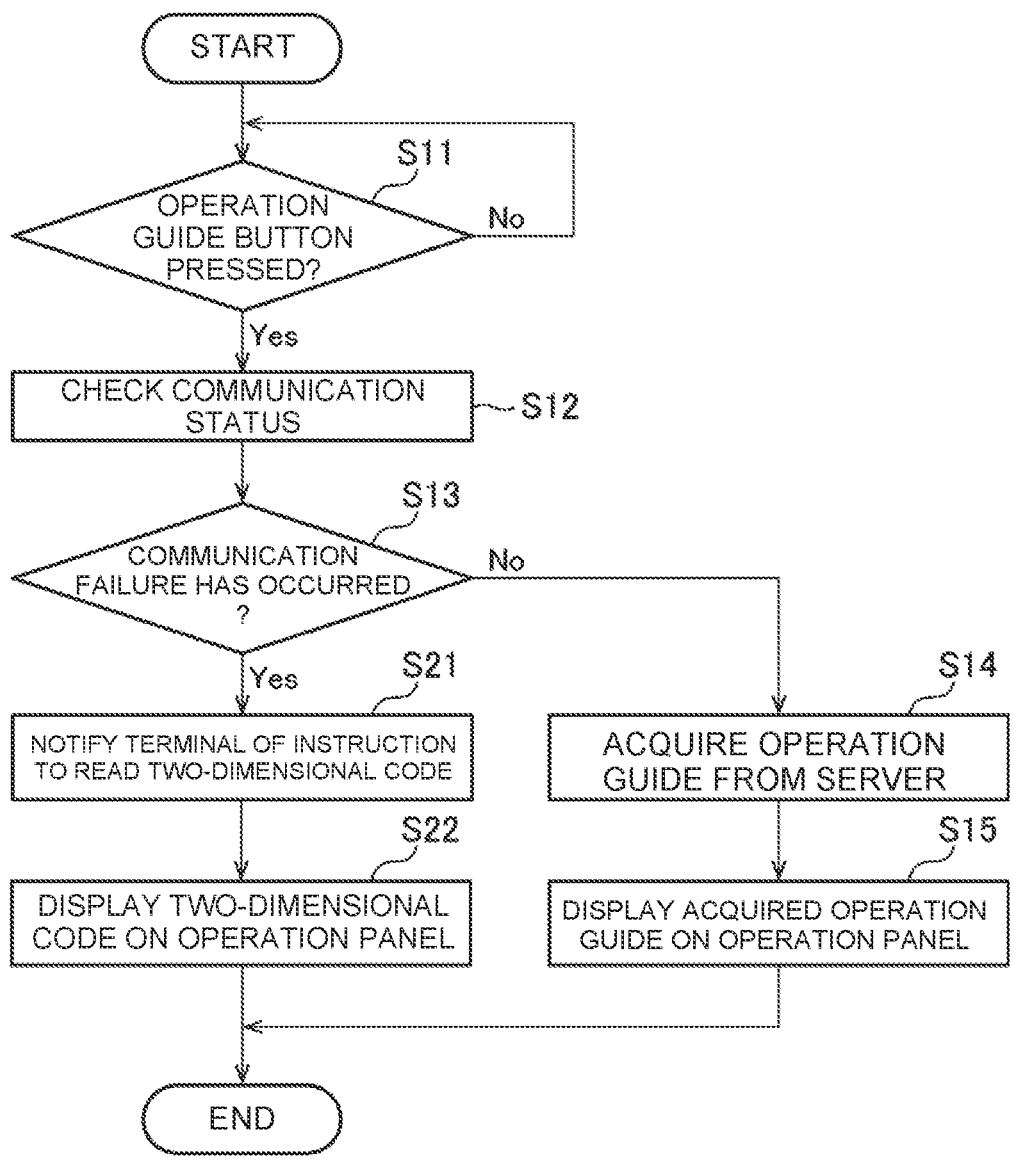
FIG. 8 is a flowchart illustrating an example of a flow of processing according to a second embodiment.

FIG. 8 is a flowchart illustrating an example of a flow of processing according to the second embodiment. Each piece of processing from step S11 to step S15 in the flowchart in FIG. 8 is the same as that in the flowchart of first processing in FIG. 7.

In a case where a controller 21 determines Yes in step S13, the controller 21 proceeds the processing to step S21. The controller 21 notifies a terminal M of an instruction to read a two-dimensional code (step S21). The notification includes a message encouraging a user to bring the user's terminal M closer to an operation panel 14.

The controller 21 performs control of displaying the two-dimensional code on the operation panel 14 (step S22). The two-dimensional code is readable by the terminal M, is a code indicating a URL of a server 12, and is equivalent to access information. The two-dimensional code may be any code such as a QR code (registered trademark). The code may also be a one-dimensional code, a three-dimensional code, or the like.

When the user brings the terminal M closer to the operation panel 14 on which a two-dimensional code is displayed based on a message displayed on a screen of the terminal M, the terminal M reads the two-dimensional code displayed on the operation panel 14. The two-dimensional code is a code indicating a URL of the server 12. Therefore, the terminal M can recognize the URL of the server 12. This allows the terminal M to communicate with the server 12 via a wireless communication network, and to acquire an operation guide for an image forming apparatus 11 from the server 12.

Note that, step S21 may be omitted. In this case, the user may recognize a two-dimensional code displayed on the operation panel 14 of the image forming apparatus 11, and bring the terminal M closer to the two-dimensional code. This allows the terminal M to recognize the URL of the server 12, whereby the terminal M can acquire an operation guide for the image forming apparatus 11 from the server 12.

Third Embodiment

Figure 9:
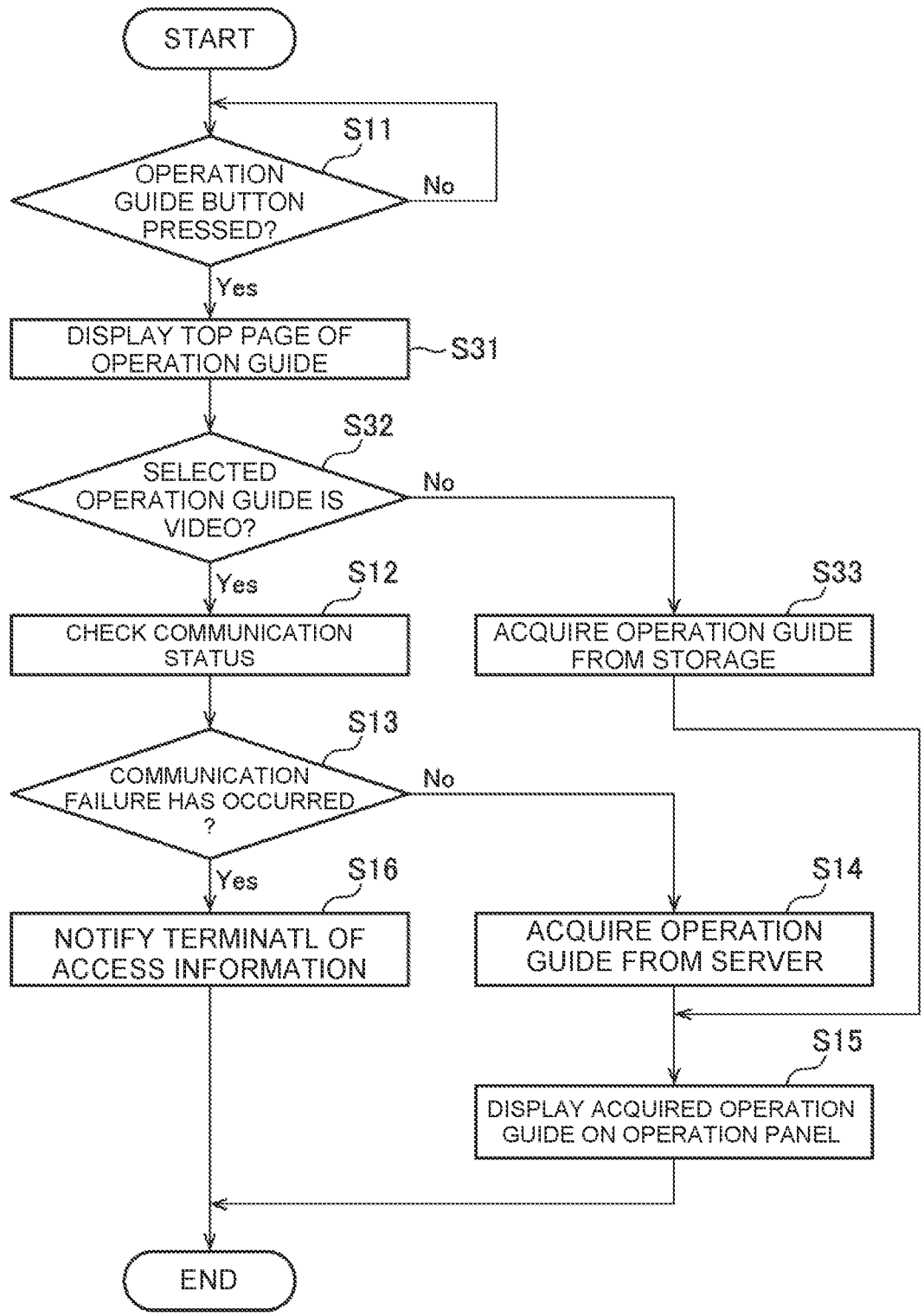
FIG. 9 is a flowchart illustrating an example of a flow of processing according to a third embodiment.

FIG. 9 is a flowchart illustrating an example of a flow of processing according to the third embodiment. In the third embodiment, it is assumed that an operation guide of text information for each function is stored in advance in a storage 25.

For example, the operation guide of text information described above may be stored in advance in the storage 25 at a time of shipment of an image forming apparatus 11. Also, a portable memory may be connected to the image forming apparatus 11 at an appropriate timing, and an operation guide of text information may be transferred from the portable memory to the storage 25. Further, the image forming apparatus 11 may periodically acquire an operation guide of text information from a server 12, and store the acquired operation guide of text information in the storage 25.

In the first and second embodiments, the controller 21 checks a communication status in response to the pressing of the operation guide button 31. In contrast, in the third embodiment, a controller 21 determines Yes in step S11, when an operation guide button 31 is pressed, and performs control of displaying a top page screen 40 of an operation guide (step S31). Thus, the top page screen 40 is displayed on an operation panel 14.

Either an operation guide of video or an operation guide of text information can be selected on the top page screen 40. The controller 21 determines whether the selected operation guide on the top page screen 40 is an operation guide of video or an operation guide of text information (step S32). In a case where the controller 21 determines Yes in step S32 (in a case where the operation guide of video is selected), the controller 21 proceeds the processing to step S12. Each piece of processing from step S12 to step S16 is the same as each piece of processing in FIG. 7.

In a case where the controller 21 determines No in step S32 (in a case where the operation guide of text information is selected), the controller 21 proceeds the processing to step S33. As described above, the operation guide of text information is stored in the storage 25. The controller 21 acquires the operation guide of text information associated with a selected function from among the operation guides of each piece of text information stored in the storage 25 (step S33).

In step S15, the controller 21 performs control of displaying the acquired operation guide on the operation panel 14. In a case where step S14 is performed, the operation guide acquired from the server 12 is displayed on the operation panel 14. In a case where step S33 is performed, the operation guide acquired from the storage 25 is displayed on the operation panel 14.

There is an upper limit on an amount of data storable in the storage 25 of the image forming apparatus 11. Since an amount of data of text information is remarkably small as compared with an amount of data of video, it is possible to store operation guides of a sufficient number of pieces of text information in the storage 25. On the other hand, since an operation guide of video requires a large amount of data, when a large number of operation guides of video are stored in the storage 25, a storage capacity of the storage 25 may be excessively reduced.

In view of the above, when the controller 21 determines that an operation guide of text information is selected in step S32, the controller 21 acquires the operation guide of text information from the storage 25, without checking whether a communication failure has occurred in the image forming apparatus 11.

In the third embodiment, since a storage destination of an operation guide is distributed between the server 12 and the storage 25, it is possible to suppress a terminal M from acquiring all the operation guides from the server 12, when a communication failure has occurred in the image forming apparatus 11.

Further, when the controller 21 determines No in step S32, the controller 21 does not perform the processing of step S12. Therefore, in a case where an operation guide of text information is selected, there is no need to perform processing of checking a communication status, and unnecessary processing can be omitted. The third embodiment described above can be applied not only to the first embodiment but also to the second embodiment.

Fourth Embodiment

Figure 10:
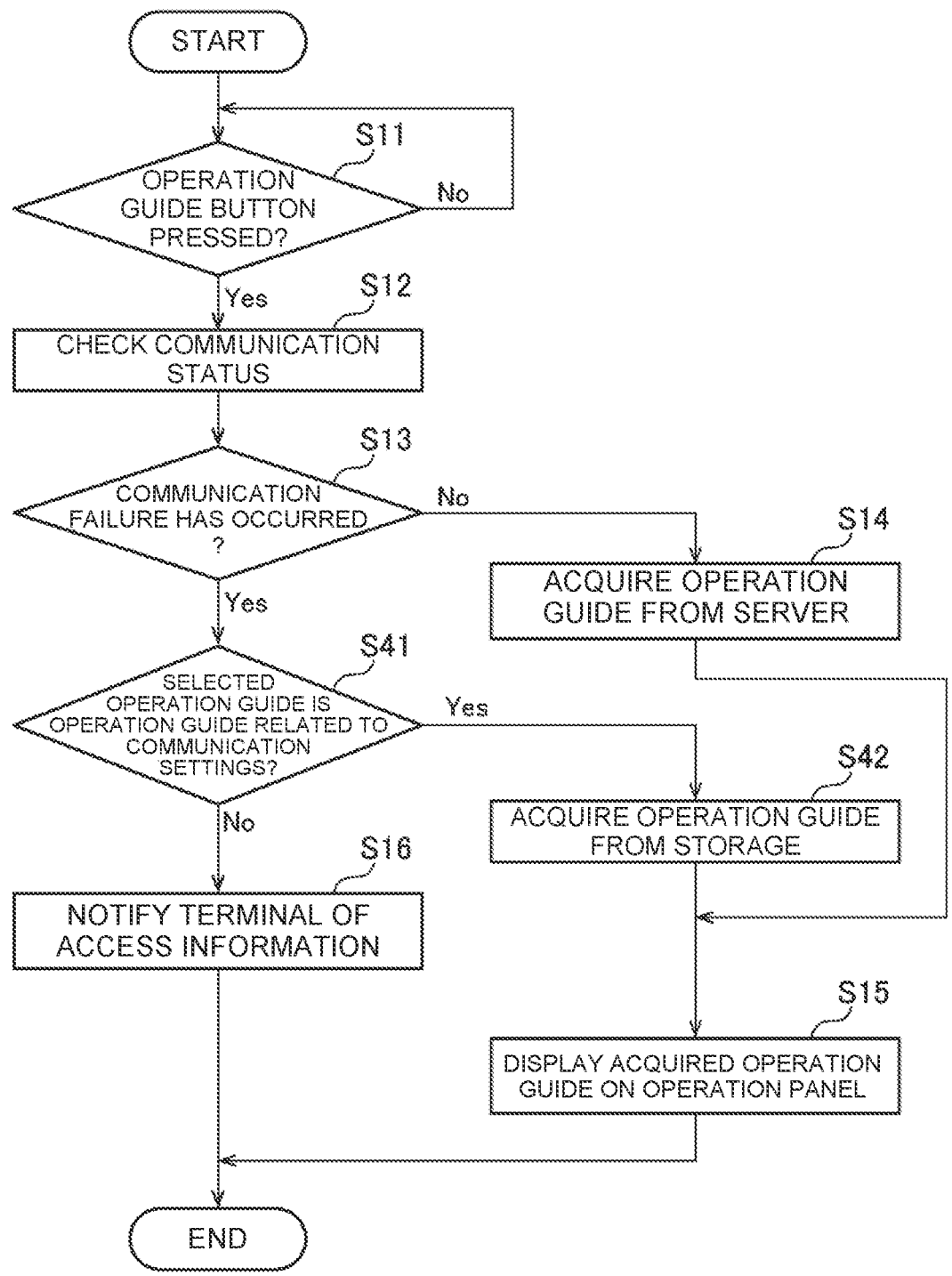
FIG. 10 is a flowchart illustrating an example of a flow of processing according to a fourth embodiment.

FIG. 10 is a flowchart illustrating an example of a flow of processing according to the fourth embodiment. In the fourth embodiment, an operation guide regarding communication settings of an image forming apparatus 11 is stored in advance in a storage 25. The operation guide regarding communication settings stored in the storage 25 may be an operation guide of text information, or may be an operation guide of video. The operation guide regarding communication settings is mainly an operation guide regarding communication settings when a first communicator 28 performs communication via a network NW. In the fourth embodiment, the operation guide regarding communication settings includes an operation guide of a method of coping with a case where a communication failure has occurred. Processing other than steps S41 and S42 is the same as that in the first embodiment.

In a case where a communication failure has occurred in the image forming apparatus 11, a controller 21 determines Yes in step S13, and proceeds the processing to step S41. The controller 21 determines whether a selected operation guide is an operation guide regarding communication settings (step S41).

In a case where the controller 21 determines Yes in step S41 (in a case where the selected operation guide is an operation guide regarding a communication failure), the controller 21 proceeds the processing to step S42. As described above, the operation guide regarding communication settings is stored in the storage 25. The controller 21 acquires the operation guide regarding communication settings from the storage 25 (step S42).

The controller 21 causes an operation panel 14 to display the acquired operation guide regarding communication settings in step S15. The acquired operation guide includes information on a method of coping with a case where a communication failure has occurred in the image forming apparatus 11. Therefore, the information on a method of copying with a case where a communication failure has occurred in the image forming apparatus 11 is displayed on the operation panel 14.

In the fourth embodiment, in a case where an operation guide is selected, and a communication failure has occurred in the image forming apparatus 11, the controller 21 does not immediately perform processing of step S16, but performs determination processing of step S41. This suppresses a terminal M from acquiring an operation guide from the server 12, in a case where an operation guide regarding communication settings is stored in advance in the image forming apparatus 11.

In a case where an operation guide regarding communication settings is stored in the image forming apparatus 11, a user may be able to take action against a communication failure of the image forming apparatus 11, and resolve the communication failure by referring to the stored operation guide regarding communication settings. In this case, the user can operate the terminal M, and omit an operation of acquiring an operation guide from the server 12. Also, for example, in a situation such as a case where some kind of failure has occurred in the server 12, or a case where a failure has occurred in a wireless communication network, the terminal M may be unable to access the server 12. In this case, the terminal M cannot acquire an operation guide regarding communication settings from the server 12. However, in the fourth embodiment, it is possible to display, on the operation panel 14, an operation guide regarding communication settings stored in the image forming apparatus 11. Therefore, even when the terminal M becomes inaccessible to the server 12, the communication failure described above may be resolved.

The operation guide regarding communication settings may be a video. Since the user can check, by video, an operation guide regarding communication settings to be displayed on the operation panel 14, it is possible to present a method of resolving a communication failure to the user more comprehensively. Also, regarding an operation guide of video, the storage 25 stores an operation guide focused on communication settings among all the operation guides. Therefore, it is possible to acquire the advantageous effect described above, while reducing an amount of data of an operation guide stored in the storage 25. The fourth embodiment can be applied to any of the first to third embodiments.

Fifth Embodiment

Figure 11:
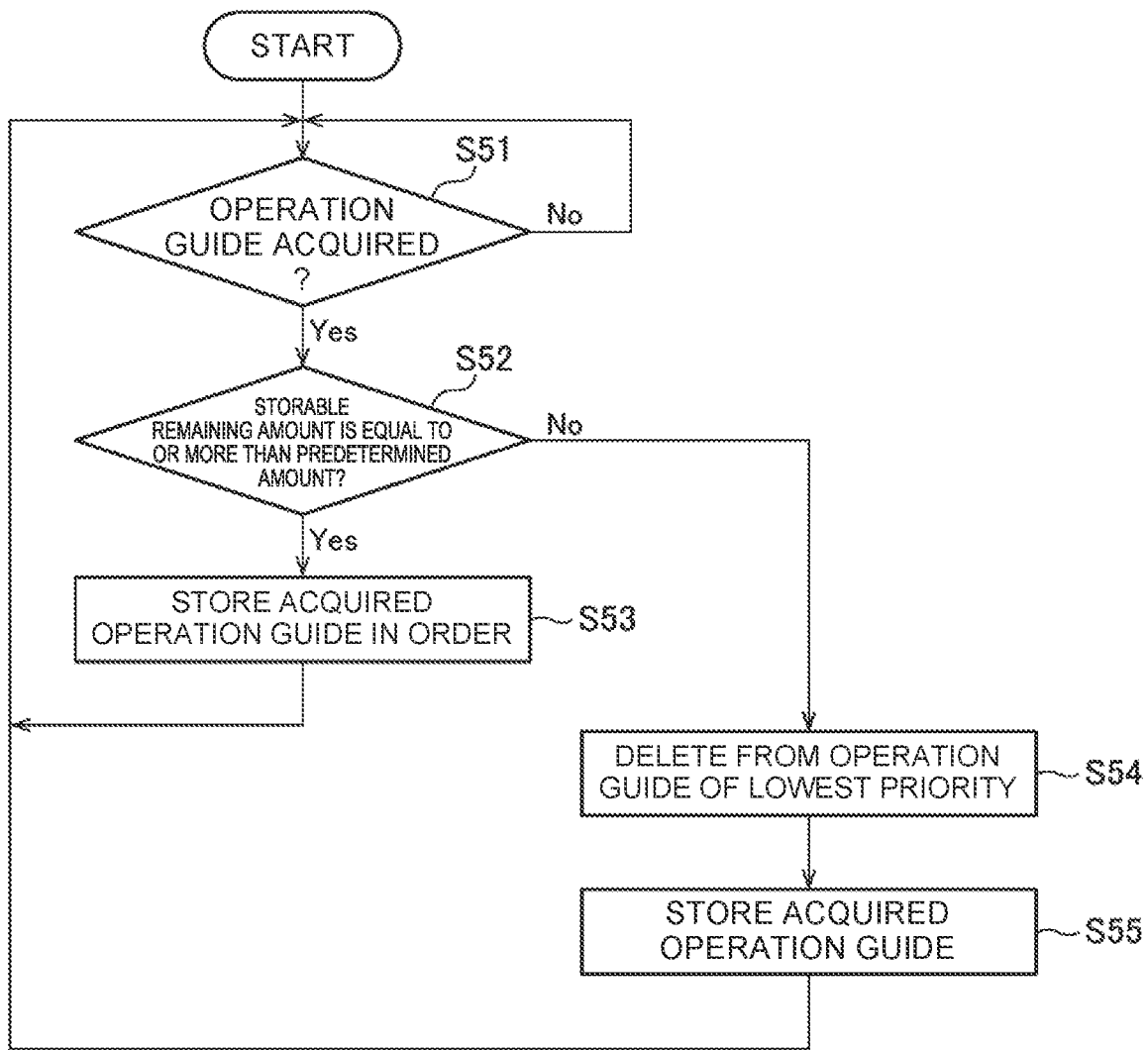
FIG. 11 is a flowchart illustrating an example of a flow of storage processing of an operation guide when the operation guide is acquired.

Next, the fifth embodiment is described. FIG. 11 is a flowchart illustrating an example of a flow of storage processing of an operation guide, when an image forming apparatus 11 acquires the operation guide. The flowchart in FIG. 11 is performed, when a communication failure has not occurred in the image forming apparatus 11. A controller 21 determines whether an operation guide has been acquired from a server 12 (step S51). When determining No in step S51, the controller 21 returns the processing to step S51. In this case, the controller 21 waits until an operation guide is acquired.

In a case where the controller 21 determines Yes in step S51, the controller 21 proceeds the processing to step S52. The controller 21 determines whether a remaining amount storable in an area (cache area) of a storage 25 that stores an operation guide is equal to or more than a predetermined amount (step S52). The cache area of the storage 25 is, for example, an area used as a cache for temporarily storing an operation guide. The predetermined amount can be set to a predetermined ratio with respect to an upper limit of the cache area.

In a case where the controller 21 determines Yes in step S52 (in a case where the remaining amount is equal to or more than the predetermined amount), the controller 21 proceeds the processing to step S53. In this case, there is room in the remaining amount of the cache area of the storage 25. The controller 21 performs control of storing acquired operation guides in order in the cache area of the storage 25 (step S53). Thus, the acquired operation guides are stored in order in the cache area of the storage 25. After performing the processing of step S53, the controller 21 returns the processing to step S51.

In a case where the controller 21 determines No in step S52 (in a case where the remaining amount is less than the predetermined amount), the controller 21 proceeds the processing to step S54. In this case, the remaining amount of the cache area of the storage 25 is small. The controller 21 deletes the operation guide of a lowest priority among a plurality of operation guides stored in the cache area of the storage 25 (step S54).

The controller 21, for example, manages the number of times of viewing in association with each of the operation guides stored in the cache area of the storage 25. The number of times of viewing indicates the number of times an operation guide has been read for display on an operation panel 14.

An operation guide having a small number of times of viewing is an operation guide whose frequency of use by a user is low, and having a low priority of use. For this reason, the controller 21 preferentially deletes an operation guide having a smallest number of times of viewing from the cache area of the storage 25, as the operation guide of the lowest priority.

The controller 21 stores the acquired operation guide in the cache area of the storage 25 (step S55). After performing the processing of step S55, the controller 21 returns the processing to step S51. The flowchart in FIG. 11 ends, when a predetermined finishing condition is satisfied (e.g., when the power of the image forming apparatus 11 is turned off).

An amount of data of an operation guide acquired from the server 12 by the image forming apparatus 11 may be large. In this case, the controller 21 may delete operation guides of the number according to the amount of data of the acquired operation guide from the cache area of the storage 25.

Figure 12:
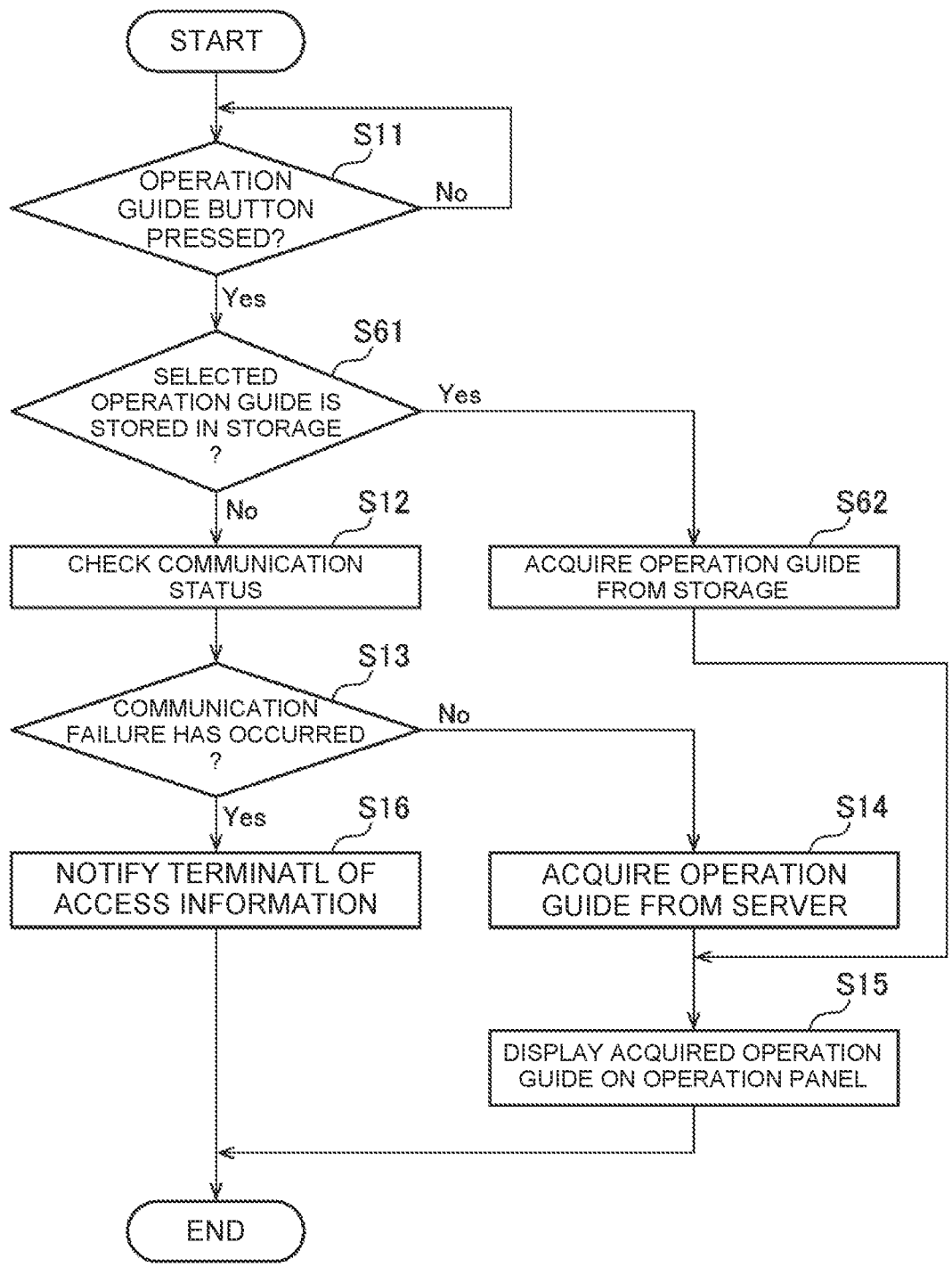
FIG. 12 is a flowchart illustrating an example of a flow of processing according to a fifth embodiment.

FIG. 12 is a flowchart illustrating an example of processing according to the fifth embodiment. The flowchart in FIG. 12 includes steps S61 and S62, in addition to the steps in the flowchart in FIG. 7. Each piece of processing from step S11 to step S16 is the same as that in the first embodiment.

In a case where the controller 21 determines Yes in step S11, the controller 21 proceeds the processing to step S61. The controller 21 determines whether a selected operation guide is stored in the cache area of the storage 25 (step S61). In a case where the controller 21 determines No in step S61, the controller 21 proceeds the processing to step S12.

In a case where the controller 21 determines Yes in step S61, the controller 21 acquires the selected operation guide from among the operation guides stored in the cache area of the storage 25 (step S62). In step S15, the controller 21 causes the operation panel 14 to display the acquired operation guide.

In the fifth embodiment, in a case where an operation guide is stored in the image forming apparatus 11, the stored operation guide can be displayed on the operation panel 14. In this case, a terminal M does not need to acquire the operation guide from the server 12. This enables to reduce the number of times of causing the terminal M to acquire an operation guide from the server 12, while acquiring an advantageous effect that the user can view the operation guide, even when a communication failure has occurred in the image forming apparatus 11.

The fifth embodiment can be applied to any of the first to fourth embodiments. For example, in the flowchart in FIG. 11, in a case where the controller 21 determines Yes in step S52, the controller 21 may set the priority of an operation guide of text information higher than the priority of an operation guide of video, and store the acquired operation guide of text information in the storage 25. Thus, an operation guide of text information is preferentially stored in the storage 25.

In the third embodiment, an operation guide of text information is stored in advance in the storage 25. The operation guide of text information may be updated to a new operation guide. As described above, preferentially storing an operation guide of text information in the storage 25 makes it easy to acquire a new operation guide of text information in step S33 of the flowchart in FIG. 9 in the third embodiment.

Further, in the flowchart in FIG. 11, in a case where the controller 21 determines Yes in step S52, the controller 21 may set the priority of an operation guide regarding communication settings higher than the priority of another operation guide, and store the acquired operation guide regarding communication settings in the storage 25. Thus, an operation guide regarding communication settings is preferentially stored in the storage 25.

In the fourth embodiment, an operation guide regarding communication settings is stored in advance in the storage 25. The operation guide regarding communication settings may be updated to a new operation guide. As described above, preferentially storing an operation guide regarding communication settings in the storage 25 makes it easy to acquire a new operation guide regarding communication settings in step S42 of the flowchart in FIG. 10 in the fourth embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image forming apparatus comprising:
    a displayer capable of displaying one or more operation guides for the image forming apparatus;
    a first communicator that performs communication for acquiring the one or more operation guides from an external device via a network;
    a second communicator that performs short-range wireless communication with a terminal of a user operating the image forming apparatus;
    one or more controllers that notify, via the second communicator, the terminal of the user of access information for accessing the external device for acquiring the one or more operation guides in a case that a failure has occurred in the communication performed by the first communicator; and
    a storage that stores the one or more operation guides that are acquired,
    wherein in a case that an operation guide stored in the storage is selected, the one or more controllers cause the displayer to display the selected operation guide among the one or more operation guides stored in the storage, and
    in a case that an operation guide that is not stored in the storage is selected and the failure has occurred in the communication performed by the first communicator, the one or more controllers notify, via the second communicator, the terminal of the user of the access information for accessing the external device and cause the displayer to display a two-dimensional code indicating an address of the external device and readable by the terminal of the user, as the access information for accessing the external device.

2. The image forming apparatus according to claim 1, wherein
    the storage stores an operation guide comprising text information, and
    in a case that the operation guide comprising text information is selected, the one or more controllers read the operation guide comprising text information from the storage, and cause the displayer to display the operation guide comprising text information without checking whether the failure has occurred in the communication performed by the first communicator.

3. The image forming apparatus according to claim 1, wherein
    the storage stores an operation guide comprising information regarding communication settings, and
    in a case that the operation guide comprising information regarding communication settings is selected when the failure has occurred in the communication performed by the first communicator, the one or more controllers read the operation guide comprising information regarding communication settings from the storage, and cause the displayer to display the operation guide comprising information regarding communication settings without notifying the terminal of the user of the access information.

4. The image forming apparatus according to claim 1, wherein
    in the case that the selected operation guide is stored in the storage, the one or more controllers read the selected operation guide from the storage, and cause the displayer to display the selected operation guide without notifying the terminal of the user of the access information.

5. The image forming apparatus according to claim 1, wherein
    the one or more controllers store the one or more operation guides acquired by the first communicator in the storage in an order based on a priority level of each operation guide, and
    in a case that an amount of data of an operation guide to be stored in the storage reaches a predetermined amount, the one or more controllers delete an operation guide of a lowest priority from the storage.

6. The image forming apparatus according to claim 5, wherein
    the operation guide of the lowest priority comprises an operation guide that has a smallest number of times of viewing among the one or more operation guides stored in the storage.

7. The image forming apparatus according to claim 1, wherein
    the one or more controllers further notify the terminal of the user of an instruction to read the two-dimensional code.

8. A control method comprising:
    by a computer of an image forming apparatus including a displayer capable of displaying one or more operation guides for the image forming apparatus, performing, via a first communicator, communication for acquiring the one or more operation guides from an external device via a network;
    performing, via a second communicator, short-range wireless communication with a terminal of a user operating the image forming apparatus;

notifying, via the second communicator, the terminal of the user of access information for accessing the external device for acquiring the one or more operation guides in a case that a failure has occurred in the communication performed by the first communicator;
storing, by a storage, the one or more operation guides that are acquired;
in a case that an operation guide stored in the storage is selected, causing the displayer to display the selected operation guide among the one or more operation guides stored in the storage;
in a case that an operation guide that is not stored in the storage is selected and the failure has occurred in the communication performed by the first communicator, notifying, via the second communicator, the terminal of the user of the access information for accessing the external device and causing the displayer to display a two-dimensional code indicating an address of the external device and readable by the terminal of the user, as the access information for accessing the external device.

* * * * *